United States Patent [19]

Scantlin

[11] 3,772,684

[45] Nov. 13, 1973

[54] PUSH BUTTON KEYBOARD WITH OSCILLATOR KEYING

[75] Inventor: John R. Scantlin, Los Angeles, Calif.

[73] Assignee: Scantlin Electronics, Inc., Los Angeles, Calif.

[22] Filed: Jan. 26, 1972

[21] Appl. No.: 220,936

[52] U.S. Cl. ......... 340/365 L, 317/101 C, 336/131, 340/365 E

[51] Int. Cl. .......................... H04l 15/06, G08c 1/00

[58] Field of Search ..................... 340/365 C, 365 L

[56] References Cited

UNITED STATES PATENTS 3,707,686 12/1972 Uekusa ........................... 340/365 L 2,913,688 11/1959 Slebodnick ...................... 340/365 L 3,691,555 9/1972 Looschen ........................ 340/365 C

FOREIGN PATENTS OR APPLICATIONS 1,176,212 8/1964 Germany ......................... 340/365 C

*Primary Examiner*—Thomas B. Habecker

*Attorney*—Ford W. Harris, Jr. et al.

[57] ABSTRACT

A push button keyboard with no moving contacts. A keyboard with an oscillator for each push button, with pushing of the button changing the oscillator frequency. Circuitry for sequentially sampling the push button oscillators for comparison with a master oscillator to determine push button position. Circuitry providing a hysteresis band to eliminate push button bounce and indefinite button motion problems.

16 Claims, 10 Drawing Figures

PUSH BUTTON KEYBOARD WITH OSCILLATOR KEYING

This invention relates to keyboards and in particular, to a new and improved keyboard with a plurality of push buttons having no moving contacts. Push bottons for keyboards have been in use for a long time for generating electrical signals coded to identify the particular button pushed.

Over the years, various arrangements have been devised to simplify the contact construction and reduce the problems encountered in the contact design and maintenance. However all types of moving contacts eventually cause problems and it is often the case that the major maintenance costs in electronic equipment arises from keyboard contact problems.

Another problem encountered in the use of push button keyboards is the prevention of generation of a second or third electrical signal which might be caused by contact bounce or by jiggle of the push button by the operator, and the prevention of generation of an electrical signal when a button is depressed part way, sometimes referred to as idefinite motion of the button by the operator. Some mechanical keyboard systems utilize toggle actions for reducing some of these problems, however contact bounce, contact wear and contact deterioration remain as obstacles to long and trouble-free operation.

It is an object of the present invention to provide a new and improved push button keyboard which is all electronic, except for the push button plunger, and which requires no moving contacts. A further object is to provide such a keyboard which is particularly adapted for utilization of printed circuit boards and integrated circuits. The keyboard of the present invention operates without moving contacts and eliminates the problems of contact bounce and idenfinite push button motion. The keyboard is not limited to any particular number of keys and can be utilized to generate any desired code for transmission or subsequent use. A particular advantage is the feature that one push button does not have to be released in order to generate a signal when the next button is pushed. In fact, all but one button of the keyboard can be held down and pushing of the remaining button will generate the code for that button. A further object is to provide such a push button keyboard which is inexpensive and trouble-free and which will have very long operating life.

The keyboard of the invention contemplates a plurality of push buttons mounted in a housing, with a push button oscillator for each button. Motion of a push button changes the frequency of the corresponding oscillator, preferably by moving the push button plunger through a coil of the oscillator circuit. In the preferred embodiment, the oscillator coils and capacitors are formed in a multilayer printed circuit board, with the remainder of the circuitry in and on the board, comprising primarily integrated circuit chips. A master oscillator provides a reference frequency which is compared with each of the push button oscillator frequencies in sequence as the push buttons are scanned. A logic system provides for generation of an output signal corresponding to the particular button when the button is first pushed, while blocking generation of output signals while the button remains pushed.

Other objects, advantages, features and results will more fully appear in the course of the following description. The drawings merely show and the description merely describes a preferred embodiment of the present invention which is given by way of illustration or example.

Figure 7A:
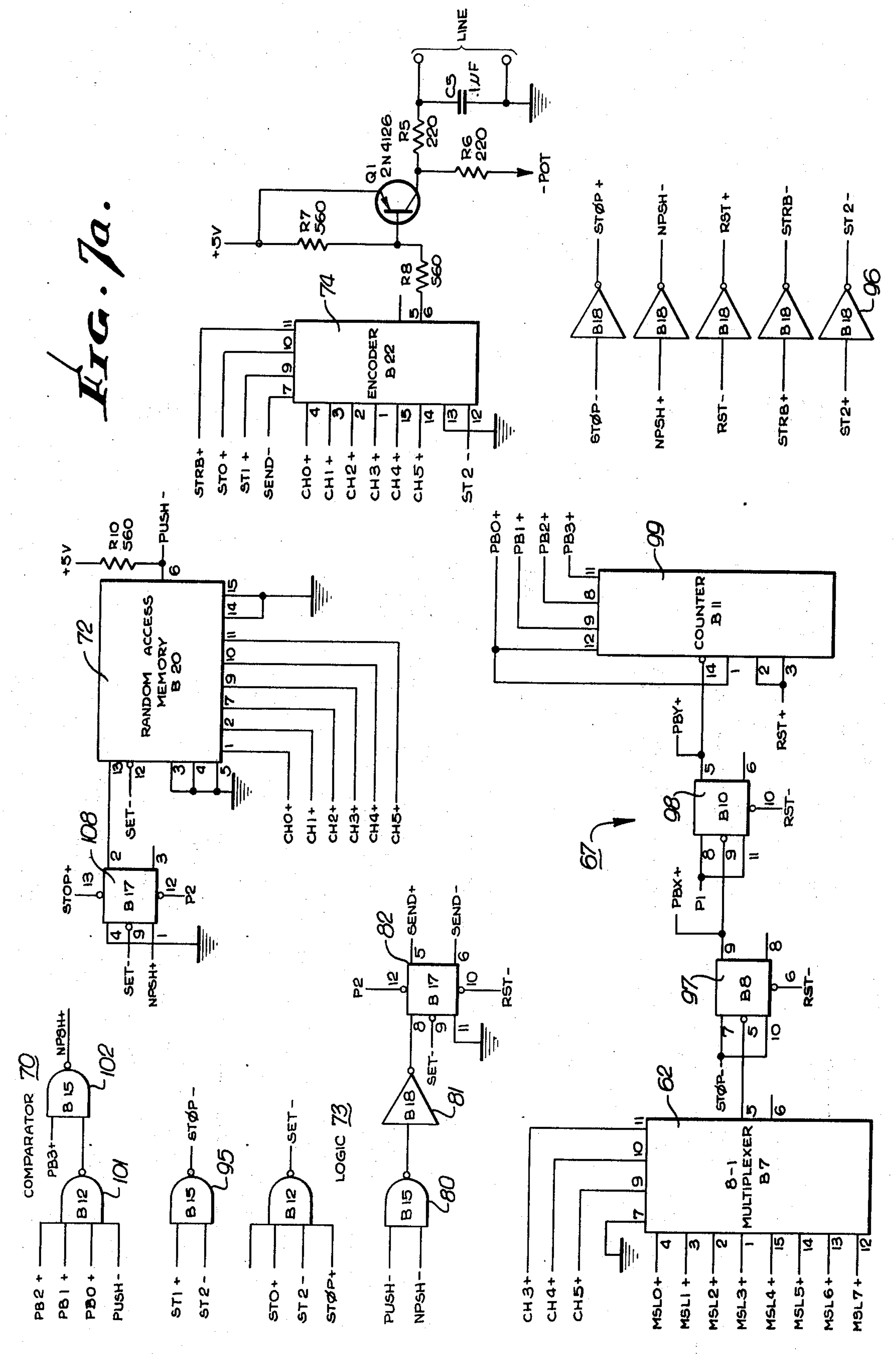
Figure 7B:
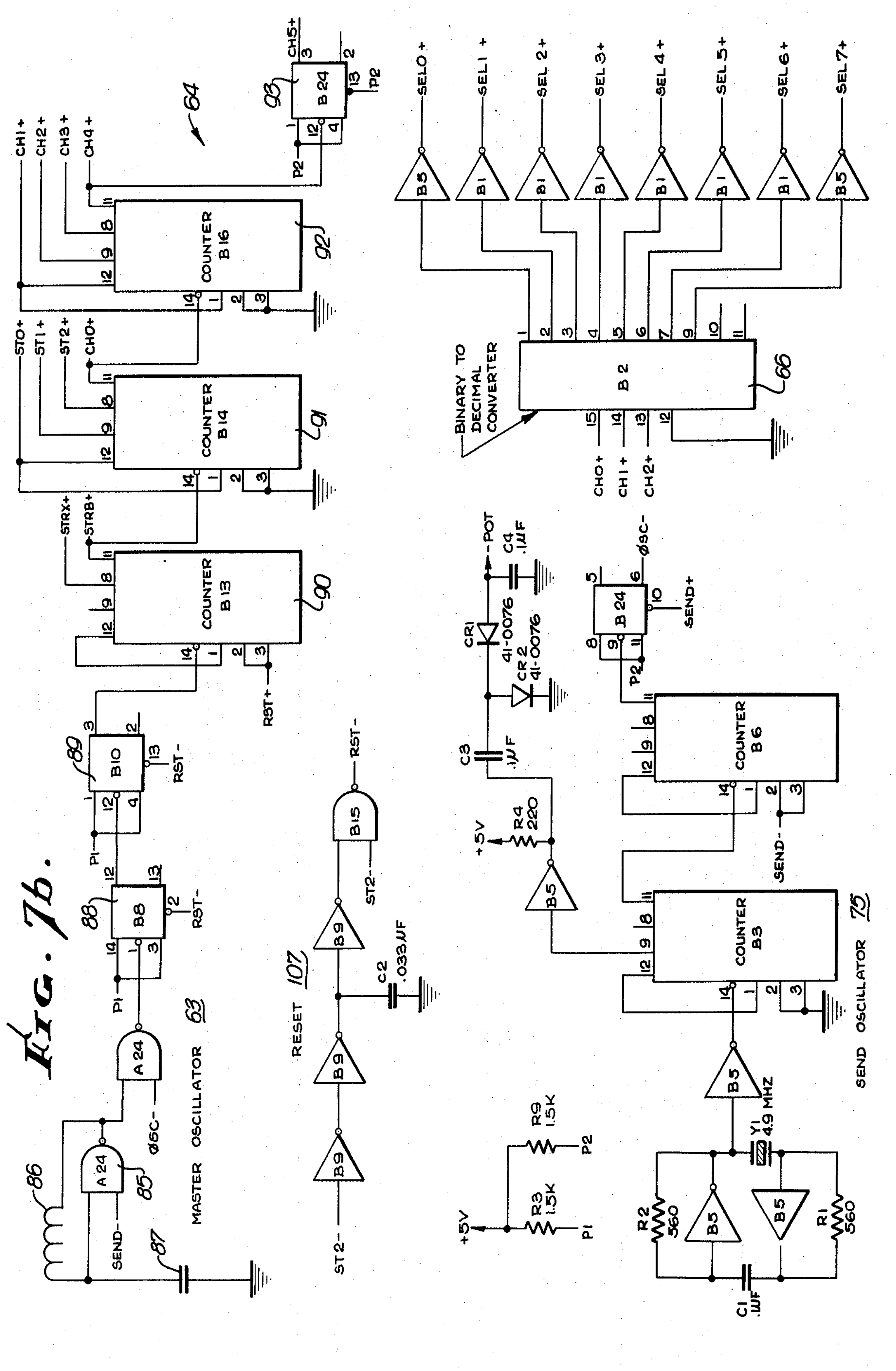
Figure 8:
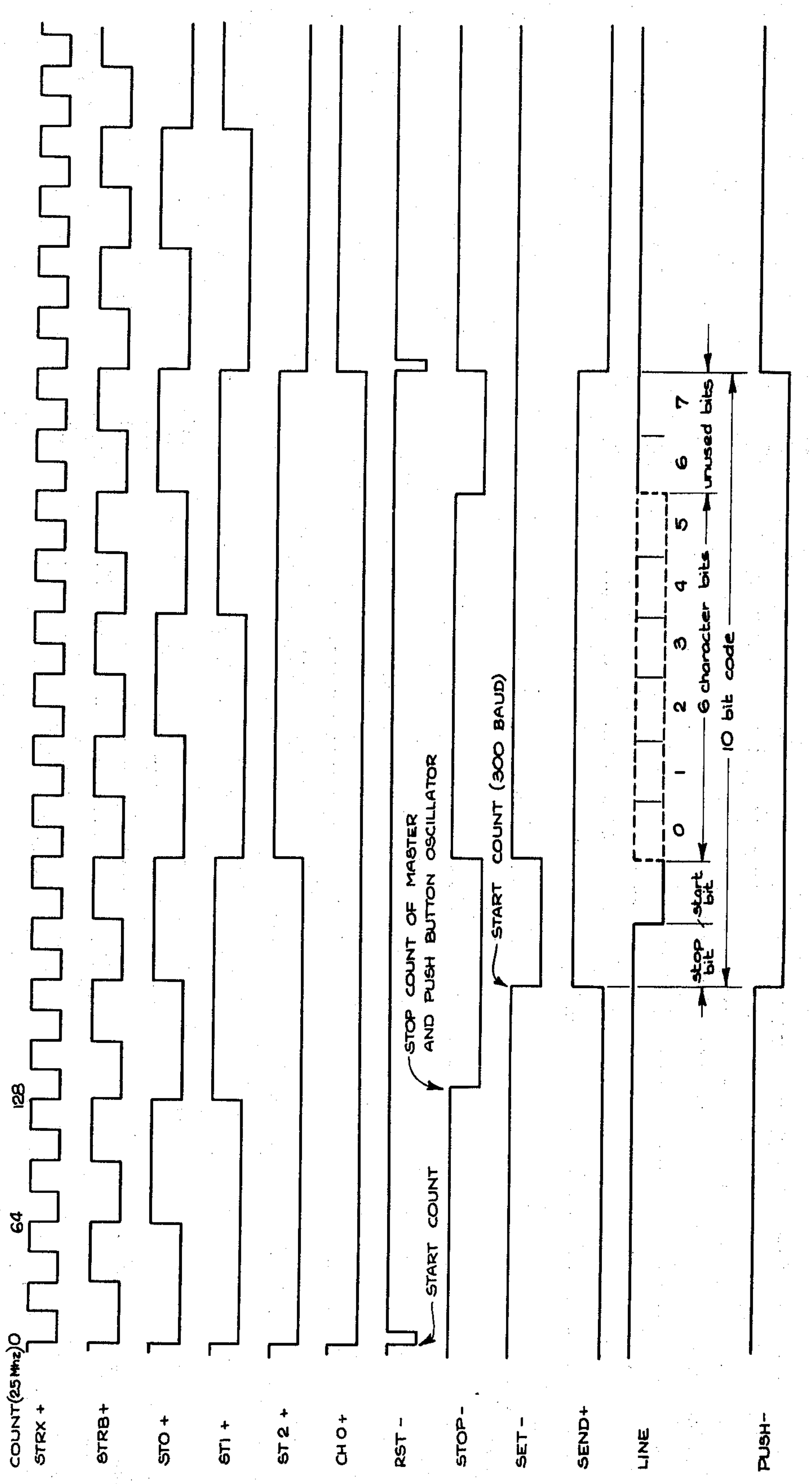

FIGS. 7*a* and 7*b* are a schematic of the remainder of the push button keyboard;

FIG. 8 is a timing diagram illustrating the operation of the keyboard; and

Figure 9:
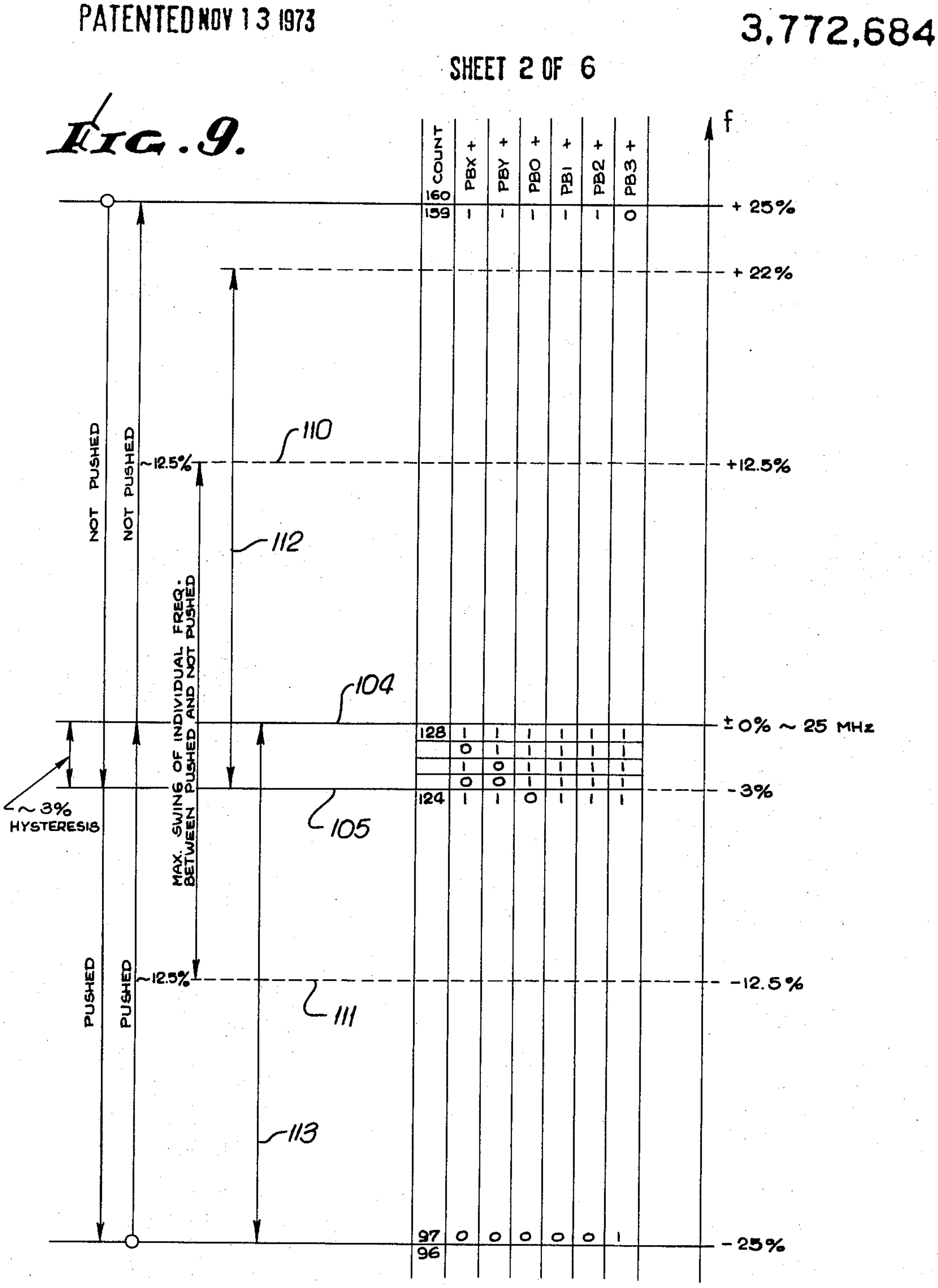

FIG. 9 is a diagram illustrating the oscillator frequency count comparison.

Figures 1, 2, 3:
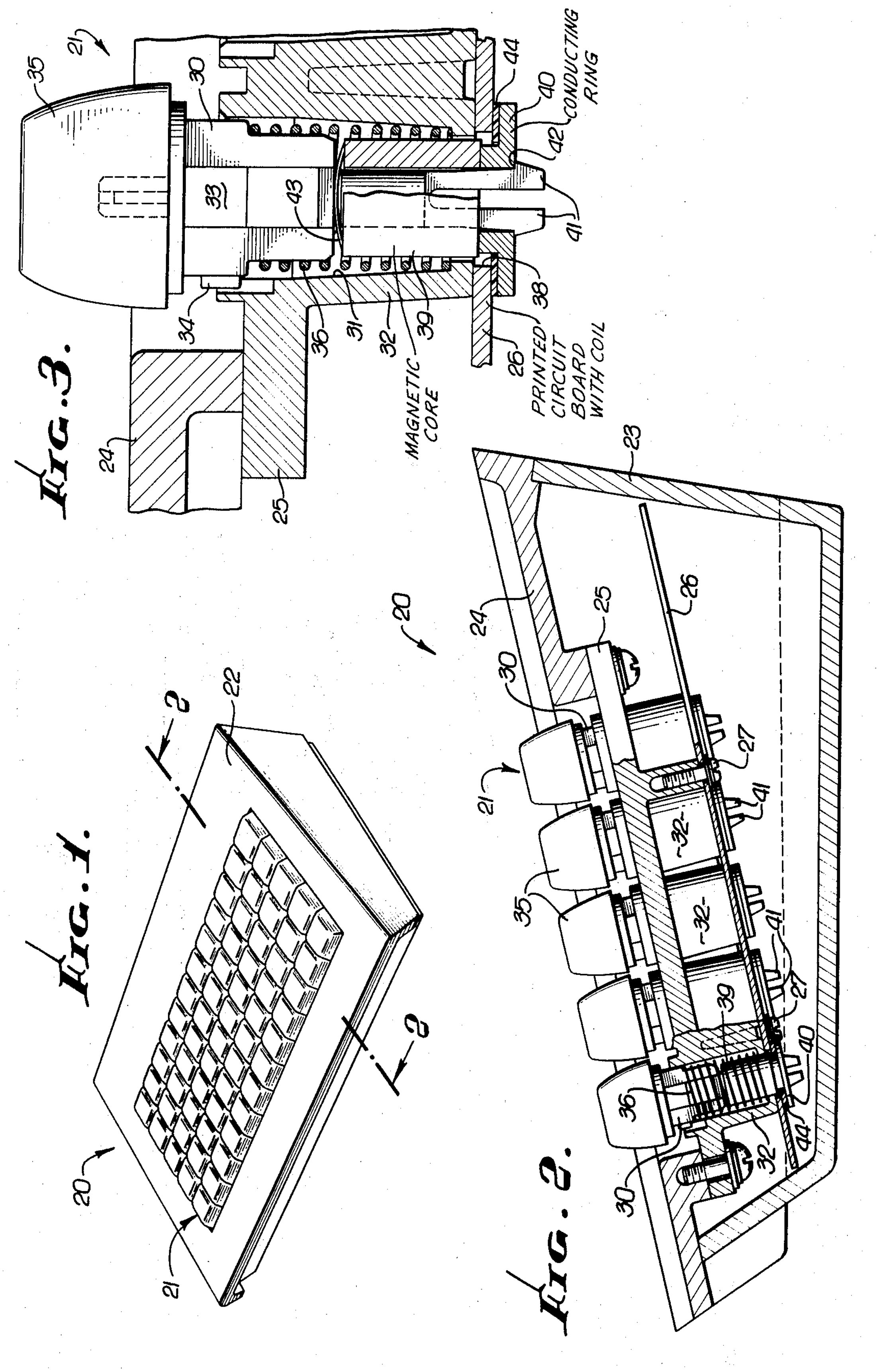
FIG. 1 is a perspective view of a push button keyboard incorporating the presently preferred embodiment of the invention.
FIG. 2 is an enlarged sectional view taken along the line 2—2 of FIG. 1.
FIG. 3 is an enlarged partial sectional view of a push button of FIG. 2.

A keyboard 20 is illustrated in FIGS. 1—3 with sixty push buttons 21 carried therein. The push buttons are mounted in a housing 22 comprising a base 23, a cover 24 and a housing plate 25 mounted on the cover. A printed circuit board 26 is mounted on bosses of the plate 25 by screws 27.

A preferred construction for the push buttons 21 is illustrated in FIG. 3, with a push button plunger 30 positioned in a bore 31 of a boss 32 projecting downward from the plate 25. The plunger 30 may be cruciform in shape in the intermediate section 33, with a key 34 riding in a slot in the plate 25 to prevent rotation of the plunger. A cap 35 may be pressed onto the upper end of the plunger. A srping 36 is positioned between a shoulder on the plunger and a shoulder at the lower end of the boss 32, urging the plunger to the upward or not pushed positioned as seen in FIG. 3.

The plunger 30 of the push button 21 is intended to move relative to a coil for changing the inductance of the coil, for the purpose of changing the frequency of an oscillator associated with the coil. In the preferred embodiment illustrated, the coil is formed in the multilayer circuit board 26 and comprises a plurality of interconnected conducting loops about an opening 38, with the plunger moving through the opening. The change of inductance of the coil is enhanced by carrying a piece of magnetic material on the plunger of the push button. The change of inductance is further enhanced by also carrying a closed loop conductor on the push button. In the embodiment of FIG. 3, a sleeve 39 of magnetic material, typically a ferrite, is slid onto the lower end of the plunger. A ring 40 of conducting material, typically brass, is also pushed onto the lower end of the plunger. The plunger is provided with projecting arms 41 with tapered ends. The arms 41 are squeezed toward each other when the sleeve 39 and ring 40 are pushed on, with expansion of the arms to the position shown in FIG. 3 serving to retain the sleeve and ring in place by engagement of shoulders 42 of the arms with the ring 40. A spring washer 43 may be positioned between the sleeve 39 and the central portion 33 of the plunger to maintain the sleeve and ring in a fixed position on the plunger. An insulating washer 44 may be positioned on the ring 40 to electrically insulate the ring from the circuit board 26.

When the push button is in the up or not pushed position, the ferrite sleeve 39 is substantially out of the opening 38, with the conducting ring 40 in the opening. When the button is depressed to the down or pushed position, the conducting ring is moved out of the opening and the magnetic sleeve is moved into the opening, providing a substantial change in inductance for the coil. With this construction, a frequency change for the push button oscillator in the order of 25 percent is achieved. The system utilizes a push button oscillator for each push button and a master oscillator providing a reference frequency, with the frequency of the master oscillator being intermediate the not pushed and pushed frequencies of the push button oscillators. The master oscillator frequency is referred to as the center frequency and in the embodiment described herein, the not pushed frequency of each push button oscillator is designed to be 12 ½ percent higher than the center frequency and the pushed frequency is designed to be 12 ½ percent lower than the center frequency. In the units now being produced, variations between the frequencies of the various push button oscillators are ± 2 percent.

Figure 4:
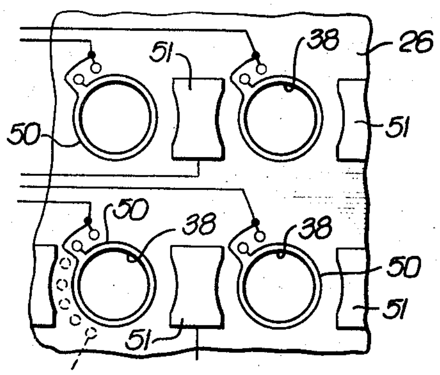
FIG. 4 is a top view of a portion of the printed circuit board illustrating a push button oscillator coil and capacitor.

Various oscillator circuits may be utilized in the keyboard of the invention, but a series resonant oscillator with both the coil and the capacitor formed in the multilayer printed circuit board is preferred. A segment of a circuit board is illustrated in FIG. 4 The coil or inductance comprises six loops 50 about the opening 38, with each loop on a separate layer and with the end of one loop connected to the start of the next loop in the conventional manner. The capacitor comprises six conducting areas 51 on the six layers of the circuit board, with the first, third and fifth areas interconnected and with the second, fourth and sixth areas interconnected to form the capacitor plates. A coil and a capacitor is provided in the board 26 for each push button. Another coil and capacitor is provided for the master oscillator. With this construction, the coils and capacitors for all sixty-one oscillators are inexpensively provided in a single circuit board.

Figure 5:
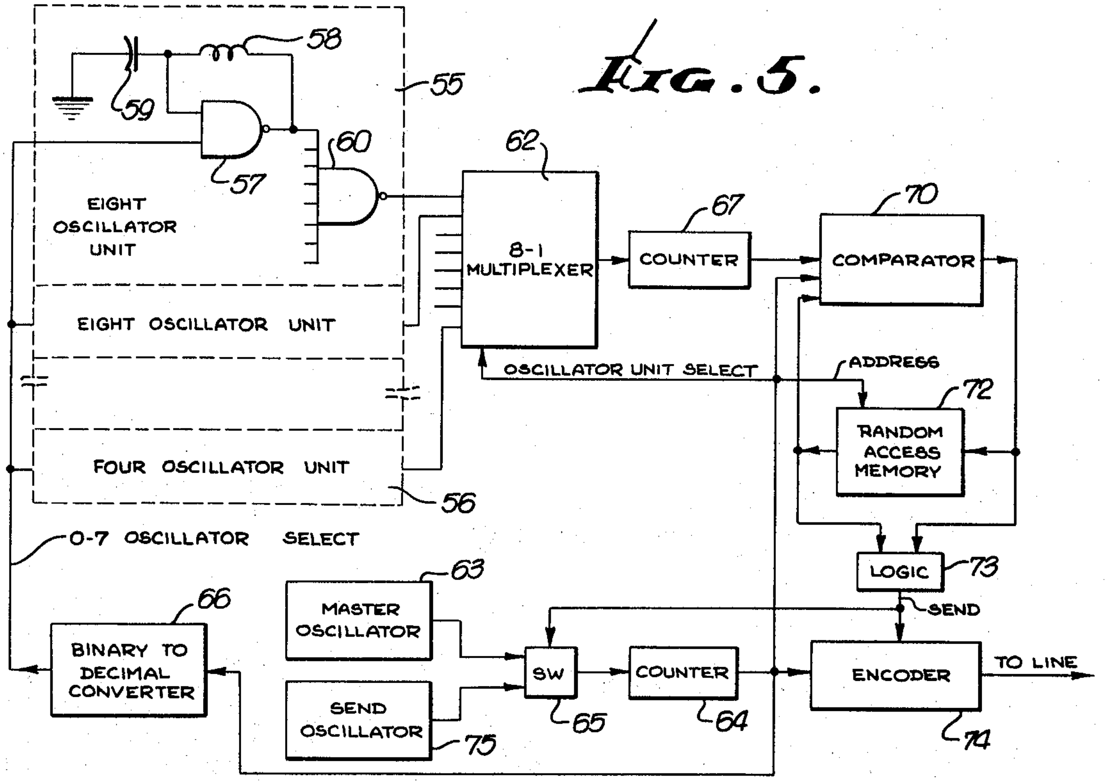
FIG. 5 is a block diagram illustrating the operation of the push button keyboard of FIG. 1.

Referring now to the block diagram of FIG. 5, the system includes 7 eight oscillator units 55 and a four oscillator unit 56 to provide sixty push button oscillators for the sixty push buttons. Each push button oscillator comprises a nand gate 57 and a series resonant circuit with a coil or inductance 58 and a capacitor 59. All the oscillators of a unit are connected as inputs to another nand gate 60. The oscillator units are identified by the digits 0 through 7 and provide eight inputs to the multiplexer 62.

The master oscillator 63 is normally connectd to a counter 64 through a switching circuit 65. The counter output is connected through a binary to decimal converter 66 to sequentially select each oscillator of the oscillator units. The counter output is also connected to the multiplexer 62 to sequentially select the output of each oscillator unit for connection to a counter 67. With this arrangement, the sixty push button oscillators are sequentially connected to the counter 67.

The counters 64 and 67 are connected to a comparator 70. When the count for a push button oscillator differs from the count for the master oscillator by a predetermined amount on one side (in the embodiment illustrated, when the push button oscillator frequency is lower than the master oscillator frequency by a predetermined amount), the comparator output indicates that the button has been pushed providing that the button was in the not pushed position at the previous time the associated push button oscillator was sampled. The not pushed or pushed condition for each push button is stored in a random access memory 72 with the counter 64 providing the address information. The stored condition for the previous counting cycle of the particular push button is provided from the memory to the comparator. The memory and comparator outputs are connected to a logic unit 73 which controls an encoder 74. When a particular push button indicated not pushed on the previous counting cycle and pushed on the preent counting cycle, the logic unit enables the encoder 74 and actuates the switch 65 to connect a send oscillator 75 through the switch 65 and counter 64 to the encoder 74 to transmit a code corresponding to the particular button pushed. When the comparator output indicates not pushed, the logic unit does not send. When the comparator output indicates pushed and the memory indicates that the previous cycle also indicated pushed, the logic unit does not send.

Figure 6:
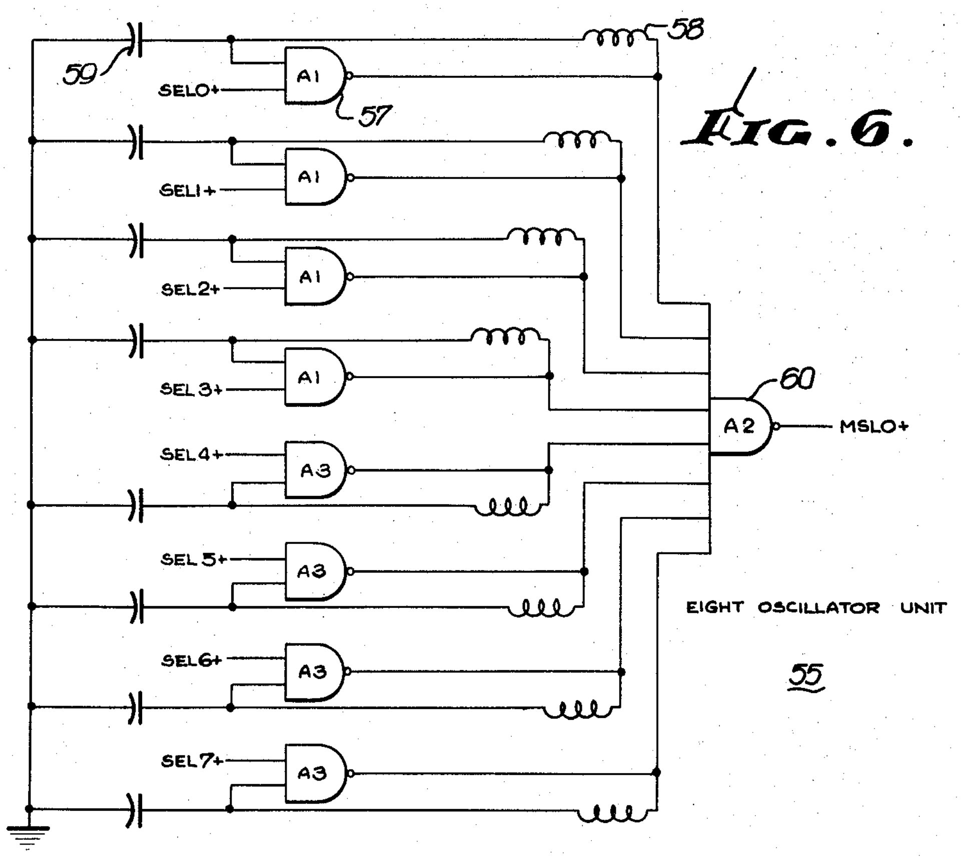
FIG. 6 is a schematic of a push button oscillator unit.

A specific circuit for the system of FIG. 5 is illustrated in FIG. 6, *7a* and *7b*. FIG. 6 shows the eight oscillator unit 55 providing output MSLO+ for the multiplexer 62 of FIG. *7a*. The other seven inputs to the multiplexer 62 MSL1+ through MSL7+ will be provided by six similar eight oscillator units and a similar four oscillator unit.

Standar symbols are used throughout in FIGS. 6, *7a* and *7b*. Names are provided for the major blocks. Referring to the left center of FIG. *7a*, item 80 is a nand gate, item 81 is an inverter, and item 82 is a flip-flop. The integrated circuits for the various components are identified in Table 1.

TABLE 1

| I C Number | I C Type |
|---|---|
| A1, A3, A24 | 74H00 |
| A2 | 74H30 |
| B1, B5, B9, B18 | 7404 |
| B2 | 7442 |
| B3, B6, B11, B13, B14, B16 | 7493 |
| B7, B22 | 74151 |
| B8 | 74H103 |
| B10, B24 | 74107 |
| B12 | 7420 |
| B15 | 7400 |
| B17 | 74H108 |
| B20 | 74200 |

The master oscillator 63 includes a nand gate 85, a coil 86 and a capacitor 87, and in the embodiment disclosed is operated at 25 megahertz. The output of the master oscillator is counted down in flip-flops 88, 89 and binary dividers 90, 91, 92 and another flip-flop 93, forming the counter 64.

ST1+ from the divider 91 is connected to nand gate 95. ST2+ from the divider 91 is connected through an inverter 96 to provide ST2– for the nand gate 95, which gate develops a stop signal at the 128 count. The timing diagram for the counting sequence is shown in FIG. 9.

While the master oscillator output is being counted, the output of the push button oscillator selected by converter 66 of the oscillator unit sampled by the multiplexer 62 is being counted in flip-flops 97, 98 and binary divder 99 forming the counter 67. Operation of the push button oscillator counter 67 is stopped when the master oscillator count reaches 128 by the output from gate 95 STOP− which is connected to the flip-flop 97.

The comparator 70 includes nand gates 101, 102. The outputs PBO+ through PB3+ from divider 99 of push button oscillator counter 67 are connected as inputs to the comparator gates. PUSH− from the memory 72 is also connected as an input to the gate 101. When the push button oscillator count is 129 or higher when counting is stopped by action of the master oscillator counter reaching 128, a not pushed signal will be provided by a gate 102. Referring to the diagram of FIG. 9, this corresponds to having a push button oscillator operating in the region above the horizontal line 104. Also, if the count of the push button oscillator counter is 128 through 125 and if the PUSH− from the memory indicates that the stored condition for the push button in question was not pushed, the comparator output will indicate not pushed. However, if the count is 124 or lower, the comparator output will indicate pushed, corresponding to the area below the horizontal line 105 of FIG. 9. The zone between lines 104 and 105, corresponding to counts 125–128 is referred to as the hysteresis band. The number of counts in this band can be changed by appropriately changing the inputs to the gate 101 of the comparator. For example, if PBY+ is added as an input to the gate 101, the hysteresis band will be reduced about 1.5 percent from the 3 percent shown in FIG. 9.

The comparator output for a particular push button is stored in the memory 72 through flip-flop 108, with the address provided by CHO+ through CH5+. The next time this particular push button oscillator is sampled, this stored signal is provided as an output PUSH− to the comparator.

The logic unit 73 determines whether or not the encoder 74 should be actuated to transmit a signal to the output line. If the comparator output indicates that the button has been pushed, that is, the push button oscillator count is 124 or lower, and the memory output indicates that on the previous counting cycle for this push button, the comparator had indicated not pushed, the logic will produce a send signal. The send signal actuates the encoder 74 and generates a 10 bit code as shown in FIG. 8. The sending frequency ordinarily is considerably lower than the master oscillator frequency and a separate send oscillator 75 can be utilized. The send signal turns off the master oscillator and connects the output of the send oscillator into the master oscillator counter, with the output of the master oscillator counter CHO+ through CH5+ providing the code for the six character bits of the encoder output.

If the push button in question remains pushed the next time its oscillator output is sampled, no code will be transmitted. If the frequency of the push button oscillator increases into the hysteresis zone, counts 125–128, the comparator will continue to provide a pushed indication, since PUSH− from the memory is one of the inputs to the comparator. The push button oscillator output must increase to a count above 128 in order to provide a not pushed indication as an output from the comparator.

The reset circuit 107 provides the reset signal for the system at the 512 count from the master oscillator, as illustrated in the timing diagram of FIG. 8, which provides time for push button oscillator counting, comparison, logic operations and storage, and transmission of an encoded ten bit character. The operation of each push button is independent of the not pushed/pushed state of all other push buttons, so that one button may be held down intentionally or accidentally, and not affect operation when other buttons are depressed.

Referring to FIG. 9, the push button oscillator frequency for the not pushed state, is intended to be 12 ½ percent above the master oscillator frequency, as indicated by the dashed line 110. Similarly, the push button oscillator frequency is designed to be 12 ½ percent below the master oscillator frequency when the push button is depressed, corresponding to the dashed line 111 of FIG. 9. However, the not pushed frequency of a push button oscillator may be anywhere between the master oscillator frequency and 22 percent above it, and the pushed frequency may be anywhere between −3 percent and −25 percent of the master oscillator frequency when the frequency change is 25 percent. The 25 percent change in frequency from the +22 percent line is indicated by the vertical line 112, and similarly the 25 percent change from the −25 percent line is indicated by the vertical line 113. Of course, the figures will change with a change in the hysteresis band or with a variation in the frequency change between not pushed and pushed.

The hysteresis band eliminates the problems normally encountered with push button bounce and indeterminate movement of a push button. A button must be pushed sufficiently to change the push button oscillator frequency to below the 105 line. If there is some bounce in the button motion, the frequency must increase above the 104 line before there is a change from pushed to not pushed in the output indication.

While specific numbers have been given for the frequencies and frequency ranges and counts in the embodiment described herein, it will be realized that while these may be the presently preferred figures, other values may be utilized while obtaining the performance characteristics and advantages of the keyboard of the invention.

I claim:

1. In a keyboard with a plurality of push buttons, the combination of:

a housing;

a coil mounted in said housing;

a push button mounted in said housing within said coil for movement between not pushed and pushed positions;

means carried by said push button for movement toward and away from said coil for changing the inductance of said coil as said push button is moved to the pushed positions, said inductance changing means including a magnetic core member and a closed loop conductor member, with one of said members moving toward said coil and the other of said members moving away from said coil as said push button is moved to the pushed position;

an oscillator having said coil in the resonant circuit thereof, with change in inductance of said coil changing the frequency of said oscillator; and circuit means coupled to said oscillator for detecting a change in oscillator frequency and producing a button pushed signal.

2. A keyboard as defined in claim 1 including a multilayer printed circuit board with an opening for said push button, and with said coil comprising interconnected conducting loops about said opening on layers of said board.

3. A keyboard as defined in claim 2 wherein said oscillator includes said coil and a capacitor, with said capacitor comprising conducting plates on layers of said board adjacent said push button opening.

4. A keyboard as defined in claim 2 including a plurality of adjacent openings in said board with a push button positioned in each opening, and with an oscillator for each opening, with each oscillator comprising interconnected conducting loops about the opening on layers of the board.

5. In a keyboard with a plurality of push buttons, the combination of:

a housing;

a coil mounted in said housing;

a push button mounted in said housing for movement between not pushed and pushed positions;

means driven by said push button for changing the inductance of said coil as said push button is moved to the pushed position;

an oscillator having said coil in the resonant circuit thereof, with change in inductance of said coil changing the frequency of said oscillator;

circuit means coupled to said oscillator for detecting a change in oscillator frequency and producing a button pushed signal; and a multilayer printed circuit board with an opening for said push button, and with said coil comprising interconnected conducting loops about said opening on layers of said board;

said housing including a bore with a shoulder, and said push button including a plunger with a shoulder, with said push button positioned in said bore with a coil spring about said plunger between said shoulders urging said push button to a not pushed position, and including means for mounting said printed circuit board on said housing with the board opening aligned with the housing bore, said plunger having a radially compressible end with a retainer tip, with said inductance changing means including a conducting ring carried on said plunger at said tip and a magnetic sleeve carried on said plunger between said ring and plunger shoulder so that said spring is compressed and said ring is moved out of said coil and said sleeve is moved into said coil as said push button is moved from the not pushed position to the pushed position.

6. In a keyboard with a plurality of push buttons, the combination of:

a housing;

a coil mounted in said housing;

a push button mounted in said housing for movement between not pushed and pushed positions;

means driven by said push button for changing the inductance of said coil as said push button is moved to the pushd position;

an oscillator having said coil in the resonant circuit thereof, with change in inductance of said coil changing the frequency of said oscillator; and circuit means coupled to said oscillator for detecting a change in oscillator frequency and producing a button pushed signal;

said circuit means for detecting including:

a second master oscillator operating at a substantially constant frequency in the frequency range of said one oscillator;

means for comparing the frequencies of said oscillators; and means for determining when the frequencies differ by at least a predetermined amount.

7. In a keyboard with a plurality of push buttons, the combination of:

a housing;

a coil mounted in said housing;

a push button mounted in said housing for movement between not pushed and pushed positions;

means driven by said push button for changing the inductance of said coil as said push button is moved to the pushed position;

an oscillator having said coil in the resonant circuit thereof, with change in inductance of said coil changing the frequency of said oscillator;

circuit means coupled to said oscillator for detecting a change in oscillator frequency and producing a button pushed signal; and a multilayer printed circuit board with an opening for said push button, and with said coil comprising interconnected conducting loops about said opening on layers of said board;

said circuit means for detecting including:

a second master oscillator operating at a substantially constant frequency in the frequency range of said one oscillator and including a coil comprising interconnected conducting loops on layers of said board and corresponding to said one oscillator coil;

means for comparing the frequencies of said oscillators; and means for determining when the frequencies differ by at least a predetermined amount.

8. A keyboard as defined in claim 7 wherein said master oscillator includes the coil and a capacitor, with said master oscillator capacitor comprising conducting plates on layers of said board corresponding to the capacitor of said one oscillator.

9. In a keyboard with a plurality of push buttons, the combination of:

a housing;

a plurality of coils mounted in said housing;

a plurality of push buttons mounted in said housing for movement between not pushed and pushed positions;

means driven by each of said push buttons for changing the inductance of a corresponding coil as the push button is moved to the pushed position;

a plurality of oscillators each having a coil in the resonant circuit thereof, with change in inductance of the coil changing the frequency of the oscillator; and circuit means coupled to said oscillators for detecting a change in oscillator frequency and producing a button pushed signal;

said circuit means including:

a master oscillator operating at a substantially constant frequency in the frequency range of said push button oscillators;

means for comparing the frequency of said master oscillator and another oscillator; and a multiplexer for sequentially connecting said push button oscillators to said means for comparing, with said means for comparing operating with the connected push button oscillator to produce the button pushed signal regardless of the current position of the push button of the previously connected oscillator.

10. In a keyboard with a plurality of push buttons, the combination of:

a housing;

a coil mounted in said housing;

a push button mounted in said housing for movement between not pushed and pushed positions;

means driven by said push button for changing the inductance of said coil as said push button is moved to the pushed position;

an oscillator having said coil in the resonant circuit thereof, with change in inductance of said coil changing the frequency of said oscillator; and circuit means coupled to said oscillator for detecting a change in oscillator frequency and producing a button pushed signal;

with said one oscillator operating at a first frequency when said push button is not pushed and at a second frequency when said push button is pushed, and with said circuit means for detecting including:

a second master oscillator operating at a third frequency intermediate said first and second frequencies;

means for comparing the frequencies of said oscillators; and means for determing when the frequency of said one oscillator changes from said first frequency toward said second frequency past said third frequency by a predetermined amount and then producing the button pushed signal, and for determining when the frequency of said one oscillator changes back toward said first frequency and producing the button pushed signal until said one oscillator reaches said third frequency.

11. A keyboard as defined in claim 10 wherein said first and second frequencies differ from said third frequency in the order of 10 percent of said third frequency, and said predetermined amount is in the order of a few percent of said third frequency.

12. In a keyboard with a plurality of push buttons, the combination of:

a housing;

a coil mounted in said housing;

a push button mounted in said housing for movement between not pushed and pushed positions;

means driven by said push button for changing the inductance of said coil as said push button is moved to the pushed position;

an oscillator having said coil in the resonant circuit thereof, with change in inductance of said coil changing the frequency of said oscillator; and circuit means coupled to said oscillator for detecting a change in oscillator frequency and producing a button pushed signal;

said circuit means for detecting including:

a second master oscillator operating at a frequency in the range of said one oscillator;

a first counter for counting the output of said one oscillator;

a second counter for counting the output of said master oscillator;

means for periodically starting counting of said first and second counters at the same time and stopping counting by said first counter when said second counter reaches a predetermined count state; and means for producing the pushed signal when the count state of said first counter is more than a predetermined amount different on one side of the count state of said second counter at the end of the count cycle.

13. A keyboard as defined in claim 12 including:

means for storing the pushed signal of said one oscillator; and means for blocking production of the pushed signal at the end of the next counting cycle if a pushed signal was produced at the end of the previous counting cycle, including means for connecting the stored pushed signal to said means for blocking as an input.

14. A keyboard as defined in claim 13 wherein said means for producing includes means for producing the opposite of the pushed signal when the count state of said first counter differs on the other side of the count state of said second counter.

15. A keyboard as defined in claim 14 wherein said means for producing includes means for blocking production of opposite of the pushed signal when the count state of said first counter is equal to or different on said one side of the count state of said second counter at the end of the next counting cycle when a pushed signal was stored at the end of the previous counting cycle.

16. A keyboard as defined in claim 12 including:

a plurality of said push button oscillators, with a coil, push button and means for changing inductance for each of said oscillators;

a multiplexer for sequentially connecting said push button oscillators to said first counter with each of said push button oscillators having an address;

means for generating a code corresponding to the address of the particular push button oscillator connected to said first counter during a counting cycle; and means for transmitting said code to a line when a pushed signal is produced.

* * * * *

UNITED STATES PATENT OFFICE
CERTIFICATE OF CORRECTION

Patent No. 3,772,684 Dated November 13, 1973

Inventor(s) John R. Scantlin

It is certified that error appears in the above-identified patent and that said Letters Patent are hereby corrected as shown below:

Column 1, line 6, "bottons" (2nd occurrence) should be --buttons--

Column 1, line 23, "definite" should be --indefinite--

Column 2, line 38, "srping" should be --spring--

Column 3, line 30, after "Fig. 4" insert --.--

Column 4, line 15, "preent" should be --present--

Column 4, line 66, "divider" should be --divider--

Column 6, line 52 (Claim 1), "positions" should be --position--

Column 7, line 60 (Claim 6), "pushd" should be --pushed--

Column 10, line 35, (Claim 15), after "of" (first occurrence) insert --the--

Signed and sealed this 7th day of May 1974.

(SEAL)
Attest:

EDWARD M.FLETCHER,JR.
Attesting Officer

C. MARSHALL DANN
Commissioner of Patents

USCOMM-DC 60376-P69
U.S. GOVERNMENT PRINTING OFFICE : 1969 O—366-334